United States Patent [19] [11] 4,428,864
Cairns et al. [45] Jan. 31, 1984

[54] COATING OF SUBSTRATES

[75] Inventors: James A. Cairns, Wantage; Edward S. Lane, Didcot; Thomas C. Prentice, Didcot; David L. Segal, Didcot; David C. Sammon, Newbury, all of England

[73] Assignee: United Kingdom Atomic Energy Authority, London, England

[21] Appl. No.: 408,037

[22] Filed: Aug. 13, 1982

[30] Foreign Application Priority Data

Mar. 3, 1982 [GB] United Kingdom ............... 8206271
Aug. 20, 1982 [GB] United Kingdom ............... 8125514

[51] Int. Cl.$^3$ ............................................. B01J 29/06
[52] U.S. Cl. .................................. 502/151; 502/158; 502/200; 502/232
[58] Field of Search .................... 252/455 R, 449, 463

[56] References Cited

U.S. PATENT DOCUMENTS 3,873,469  3/1975  Foster et al. .................... 252/455 R
4,189,405  2/1980  Knapton et al. ................. 252/455 R Primary Examiner—Delbert E. Gantz
Assistant Examiner—Anthony McFarlane
Attorney, Agent, or Firm—Larson and Taylor

[57] ABSTRACT

A substrate is provided with a refractory oxide coating by contacting the substrate with a dispersion of a solid particulate phase in a liquid phase, subsequently followed by firing to produce the coating, the dispersion comprising at least a first and a second refractory oxide component.

In order to produce a coating of controlled purity, e.g. for certain catalytic, electronic or other appications, the first refractory oxide component (e.g. an alumina) is obtained from a purifiable liquid or solid precursor therefor and constitutes part at least of the solid phase, and the second refractory oxide component is either obtained from a purifiable liquid or solid precursor therefor and constitutes part of the solid phase or is a purifiable liquid precursor (e.g. a water-soluble silicone) constituting part at least of the liquid phase.

9 Claims, No Drawings

COATING OF SUBSTRATES

The invention relates to a method of providing a substrate with a refractory oxide coating comprising contacting the substrate with a dispersion of a solid particulate phase in a liquid phase, subsequently followed by firing to produce the coating, the dispersion comprising at least a first and a second refractory oxide component.

The coating of a substrate with a refractory oxide by contacting the substrate with a dispersion in a liquid medium, subsequently followed by firing is a well-known process and may be carried out for a variety of purposes. For example, it may be carried out to protect the substrate, or to provide support material for subsequently applied catalytically active material or to endow the substrate with other properties. Examples of such processes in the art are as follows. U.K. Pat. No. 1,490,977 (corresponding to U.S. Pat. No. 3,957,692) describes a dispersion comprising a sol of a refractory carrier material (e.g. Al$_2$O$_3$), which may also contain powdered carrier material, and its use in preparing a catalyst support. U.K. Patent Application Publication No. 2,023,453A (corresponding to U.S. Pat. No. 4,297,246) describes a dispersion comprising a non-aggregated sol (e.g. of CeO$_2$ and SiO$_2$), optionally containing an aggregated sol (e.g. of Al$_2$O$_3$) and its use in coating. U.K. Patent Application Publication No. 2,064,372A (corresponding to U.S. Pat. No. 4,291,070) describes a dispersion comprising a sol (e.g. of Al$_2$O$_3$, CeO$_2$, SiO$_2$) and non-colloidal particulate matter (e.g. Al$_2$O$_3$, CeO$_2$, SiO$_2$) and its use in coating metallic particles in a fluidised bed. U.S. Pat. No. 3,518,206 describes, in Example 1 thereof, a dispersion comprising inter alia sodium silicate solution and hydrated alumina and its use in preparing a catalyst support.

However, the above described dispersions are not entirely suitable for producing coatings of a high degree of purity such as might be required for certain catalytic and electronic applications.

The invention as claimed is intended to meeting the above problems and thereby extend the scope of application of coatings on substrates obtained from dispersions.

The invention provides a method of providing a substrate with a refractory oxide coating comprising contacting the substrate with a dispersion of a solid particulate phase in a liquid phase, subsequently followed by firing to produce the coating, the dispersion comprising at least a first and a second refractory oxide component, wherein the first refractory oxide component is obtained from a purifiable liquid or solid precursor therefor and constitutes part at least of the solid phase, and the second refractory oxide component is either obtained from a purifiable liquid or solid precursor therefor and constitutes part of the solid phase or a purifiable liquid precursor constituting part at least of the liquid phase.

The use of components obtained from purifiable precursors or constituted by a purifiable precursor enables coatings of higher purity than the prior art methods to be obtained. Thus, the purifiable liquid precursors, conveniently appropriate organo compounds, may be purified by distillation and the purifiable solid precursors purified by recrystallisation in order to achieve desired levels of purity in the final product.

A refractory oxide component obtained from a purifiable liquid or solid precursor therefor may for example be alumina, titania, silica or zirconia wherein alumina is particularly preferred. An example of a suitable form of alumina is boehmite since this may be prepared from a purifiable precursor such as aluminum triethyl which may be converted to boehmite by the following reaction sequence, which is known in the art:

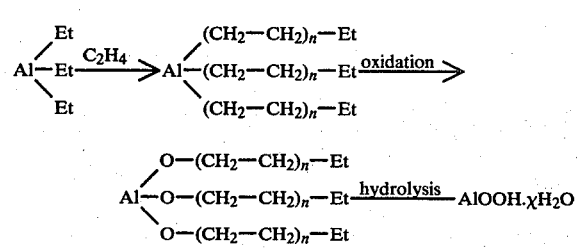

Aluminum triethyl is a liquid which is purifiable by distillation.

Another suitable form of alumina is alumina made by calcination of an alum. An alum is a purifiable precursor for alumina in that it can be purified by recrystallisation.

Another suitable form of alumina is alumina made by controlled hydrolysis of a liquid alkoxy aluminium compound such as aluminium sec-butoxide. Aluminium sec-butoxide is a commercially available liquid and is a purifiable precursor in that it may be purified by vacuum distillation, for example.

A suitable form of silica is silica made by hydrolysis of a liquid organosilicon compound such as tetraethyoxysilane which is purified by distillation.

It is apparent that a refractory oxide component obtained from a purifiable liquid or solid precursor therefor is not necessarily a refractory oxide as such but may, for example, be a hydrated form thereof.

An example of a purifiable liquid precursor constituting at least part of the liquid phase is a water-soluble silicone such as a silicone glycol copolymer. An example of such a copolymer is dimethicone copolyol which has the structural formula:

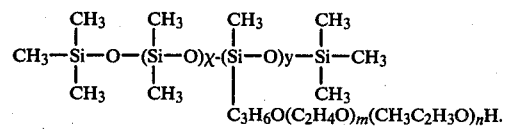

Dimethicone copolyols and related substances are sold as surfactants by Dow Corning Corporation under the trade names Dow Corning 190, Dow Corning 193 and Dow Corning Q2-5097 fluids.

Such a water-soluble silicone may be used in admixture with water as the liquid phase.

Another example of a purifiable liquid precursor constituting at least part of the liquid phase is a liquid alkyl silicate such as tetraethyl orthosilicate and ethyl polysilicate.

The above-mentioned purifiable liquid precursors constituting at least part of the liquid phase are purifiable by distillation. By "precursor" in this context is meant convertible to a refractory oxide such as silica as a result of the firing step. The above-mentioned water-soluble silicone is particularly suitable in this respect in that it is readily decomposable to silica on heating giving little or no impurities. Also, because of its surfactant properties, it assists even application of the dispersion onto the substrate. However, silicones with limited solubility in water, or in aqueous emulsion form can also be used, provided they are compatible with the other constituents of the dispersion. A quaternary ammonium silicate may be used as such a precursor either alone or in combination with a silicone.

The dispersion may include other ingredients such as a wetting agent, for example as a coating aid. The rheology of the dispersion used may be controlled by inclusion of materials such as hydrophilic polymers so that application of the dispersion onto the substrate may, for example, be carried out by doctor blade techniques. A wide range of substances may be suitable for this purpose provided, of course, that they are compatible with the other constituents of the dispersion.

The first refractory oxide component and the second refractory oxide component may give rise to the same or different refractory oxides after firing provided that the components are identifiable from one another in the dispersion. For example, the dispersion may contain alumina derived from two different precursors to constitute the two refractory oxide components.

The substrate may be a non-metallic substrate or a metallic substrate such as a steel and the coatings may be provided thereon for a number of purposes, for example to protect the substrate, for electrical purposes, or as a support for subsequently applied catalytically active material and may be applied by methods known in the art.

The invention will now be particularly described, by way of example only, as follows:

EXAMPLE 1

A dispersion was made by dispersing colloidal boehmite (200 g) in a mixture of Dow-Corning 193 dimethicone copolyol (300 g) and water (500 ml). The boehmite had been prepared from aluminium triethyl by the process described herein. A plane, non-metallic substrate was dipped into the dispersion, removed, dried and fired at 1000° C. for 1 hour. An adherent coating was obtained on the substrate.

EXAMPLE 2

A dispersion was prepared as follows. 10.0 g of "Dispural" alumina powder (Condea Chemie) were stirred into 49.8 g of a quaternary ammonium silicate (Quram 220 ex Emery Industries) containing 0.1 g of DC193. The dispersion was used to coat a substrate as described in Example 1. The alumina had been prepared from aluminium triethyl by the process described herein.

EXAMPLE 3

The procedure of Example 1 was repeated except that the dispersion was made as follows. 4.8 g of Linde A alumina powder (Union Carbide) were stirred into 50.4 g of Quram 220 containing 0.1 g of DC193. An even coating was obtained. The alumina powder had been prepared by calcination of an alum.

EXAMPLE 4

The procedure of Example 1 was repeated except that the dispersion was made as follows. 5.0 g of Dispural powder were stirred into 19.7 g of DC193. A thick coating was obtained.

EXAMPLE 5

The procedure of Example 1 was repeated except that the dispersion was made as follows. 30.0 g of Dispural powder were added to 122.0 g of DC704 silicone fluid (Dow Corning) and the mixture was homogenised for several minutes.

EXAMPLE 6

Aluminium sec-butoxide (British Drug Houses Limited) was hydrolysed to an aluminium hydroxide by addition to excess water. The hydroxide was centrifuged and washed first with methanol and then with water. The damp gel that was obtained contained about 11% of alumina by weight. The gel was stirred until a thick paste was obtained and a silica precursor, an example being Silester OS (Monsanto Limited) was stirred into the paste-residual methanol is believed to aid the mixing of the Silester. In this example the resulting dispersion contained the equivalent of 2.5% $SiO_2$, 97.5% $Al_2O_3$. The dispersion was then used to coat a substrate as described in Example 1.

Silester OS is technically a mixture of tetraethyl orthosilicate and ethyl polysilicates (i.e. monomer+polymer).

EXAMPLE 7

Aluminium sec-butoxide (British Drug Houses Limited) was hydrolyzed to an aluminium hydroxide by addition to excess water. The hydroxide was centrifuged washed several times with water, stirred to an even paste then used as a coating material.

The product described above (100 g 11% by weight $Al_2O_3$) in the form of a damp gel was mixed with alumina powder (0.3 μm particle size: Linde) and the resulting dispersion used as a coating material as described in Example 1.

EXAMPLE 8

The damp hydroxide gel prepared as in Example 6 was stirred to a paste and blended with 2 g of Linde Alumina powder and 5 cm³ of a mixture of 20 cm³ methanol/5 cm³ water/20 cm³ tetraethyl silicate (tetraethoxy silane) (B.D.H. Ltd.) so that the $SiO_2$ content was 4.7% by weight. A coating was produced from the dispersion as described in Example 1.

We claim:

1. In a method of providing a substrate with a refractory oxide coating comprising contacting the substrate with a dispersion of a solid particulate phase in a liquid phase, subsequently followed by firing to produce the coating, the dispersion comprising at least a first and a second refractory oxide component, the improvement wherein the first refractory oxide component is present as the oxide or a hydrated form thereof and is obtained from a liquid or solid precursor therefor purifiable by distillation or recrystallization and constitutes part at least of the solid phase, and the second refractory oxide component is a liquid silica precursor purifiable by distillation and constituting part at least of the liquid phase.

2. A method as claimed in claim 1, wherein the first refractory oxide component is an alumina.

3. A method as claimed in claim 2, wherein the alumina is made by the hydrolysis of a liquid organo aluminium compound.

4. A method as claimed in claim 3, wherein the liquid organo aluminium compound is aluminium sec-butoxide.

5. In a method of providing a substrate with a refractory oxide coating comprising contacting the substrate with a dispersion of a solid particulate phase in a liquid phase, subsequently followed by firing to produce the coating, the dispersion comprising at least a first and a second refractory oxide component, the improvement wherein the first refractory oxide component is obtained from a liquid or solid precursor there for purifiable by distillation or recrystallization and constitute part at least of the solid phase, and the second refractory oxide component comprises a water-soluble silicone constituting part at least of the liquid phase.

6. A method as claimed in claim 5, wherein the silicone is a silicone glycol copolymer.

7. A method as claimed in claim 6, wherein the copolymer is dimethicone copolyol.

8. In a method of providing a substrate with a refractory oxide coating comprising contacting the substrate with a dispersion of a solid particulate phase in a liquid phase, subsequently followed by firing to produce the coating, the dispersion comprising at least a first and a second refractory oxide component, the improvement wherein the first refractory oxide component is obtained from a liquid or solid precursor therefor purifiable by distillation or recrystallization and constitutes part at least of the solid phase, and the second refractory oxide component comprises a quaternary ammonium silica constituting part at least of the liquid phase.

9. A method as claimed in claim 1 wherein the substrate is non-metallic.

* * * * *